June 7, 1927.
E. L. LARISON
1,631,139
PROCESS FOR THE MANUFACTURE OF SULPHURIC ACID
Filed March 3, 1926
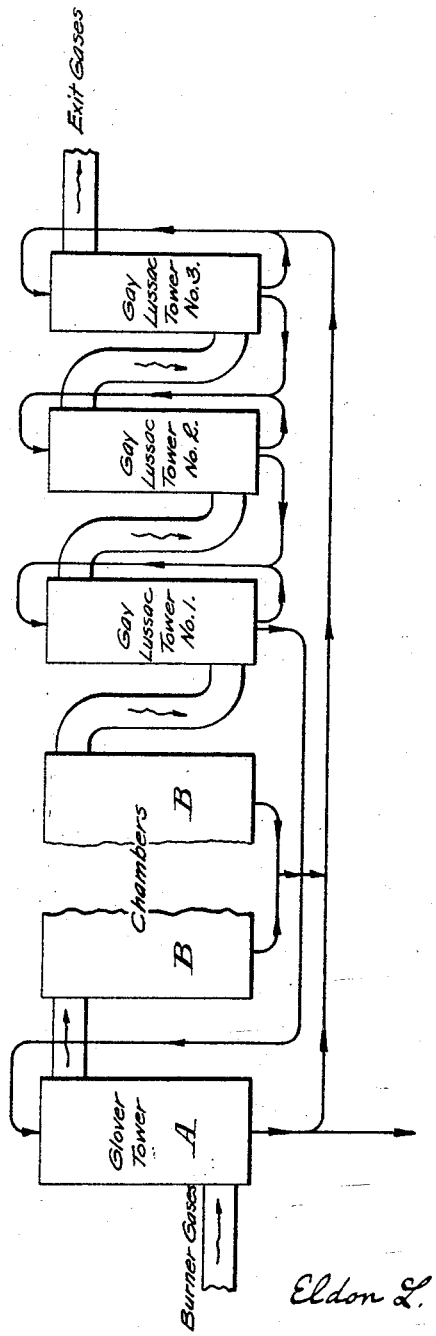
Inventor:
Eldon L. Larison
By Byrnes Townsend & Brickenstein
his Attorneys.

Patented June 7, 1927.

1,631,139

UNITED STATES PATENT OFFICE.

ELDON L. LARISON, OF ANACONDA, MONTANA.

PROCESS FOR THE MANUFACTURE OF SULPHURIC ACID.

Application filed March 3, 1926. Serial No. 92,004.

This invention relates to the manufacture of sulphuric acid and more particularly to a modification of the conventional chamber process whereby a more concentrated acid product may be obtained.

In processes involving the use of oxids of nitrogen as the principal oxidizing agent or oxygen carrier, such as the so-called chamber process, the oxids of nitrogen are repeatedly used; a typical procedure involving the denitration of the nitrous vitriol and denitration and concentration of the chamber acid by means of the hot burner gases in the Glover tower or towers, the recovery of the oxids of nitrogen in the gases leaving the chambers by scrubbing them with acid from the Glover tower in the Gay Lussac tower or towers, and the return of the resulting nitrous vitriol to the Glover tower.

In a typical chamber plant as operated at the present time, due to the fact that the Gay Lussac tower must have a sufficient capacity to permit a free flow of the gases and the packing in the tower must be properly wetted by the absorbing acid to insure an economical recovery of the oxids of nitrogen from the gases, it is necessary to supply the Gay Lussac tower with a quantity of absorbing acid amounting generally to from two to two and one-half times the "make" of the plant.

In order that the background of the invention may be clearly understood, the following description of the operation of a typical chamber plant of about 100 ton daily capacity is given. Hot burner gases at a temperature of say 1000° F. are introduced into the Glover tower where they serve to denitrate the nitrous vitriol coming from the Gay Lussac tower, say 225 tons per day at 61° Bé., and to denitrate and concentrate the chamber acid, say 125 tons per day at 50° Bé., to 97.8 tons of 61° Bé. acid, 97.8 tons of the resulting 61° Bé. acid produced by the Glover tower are set aside as the product of the plant, while the remaining 225 tons are returned to the Gay Lussac tower. As a result, the product of the plant is 61° Bé. acid whereas a stronger acid of say 66° Bé. is desired. The heat of the hot burner gases is accounted for as follows:

(1) Radiation from the walls of the Glover towers;

(2) Increasing the temperature of the 225 tons of nitrous vitriol from about 100° F. to its boiling point, about 400° F.;

(3) Increasing the temperature of the 125 tons of chamber acid from about 200° F. to about 347.5° F., the temperature means between the boiling point of the chamber acid and the boiling point of the 61° Bé. acid produced therefrom, assuming a specific heat mean between those of 50° Bé. and 61° Bé. acid;

(4) Evaporating the amount of water, about 27.2 tons, necessary to concentrate the chamber acid at the mean boiling point from 50° Bé. to 61° Bé.;

(5) Increasing the temperature of the concentrated chamber acid from the mean boiling point to about 400° F.;

(6) Heat contained in the gases leaving the Glover tower.

The quantities of heat represented by the controllable items (2), (3), (4) and (5) are represented by the following items $(a)$, $(b)$, $(c)$ and $(d)$, respectively:

$(a)$ Increasing the temperature of the nitrous vitriol. 450,000 (pounds of acid) x 300 (degrees increase in temperature) x .403 (specific heat of acid) = 54,405,000 B. t. u.

$(b)$ Increasing the temperature of the chamber acid. 250,000 (pounds of acid) x 147.5 (degrees increase in temperature) x .45 (mean specific heat) = 16,593,750 B. t. u.

$(c)$ Concentration of chamber acid. 54,400 (pounds of water evaporated) x 874 (latent heat of vaporization of water at 347.5° F.) = 47,545,600 B. t. u.

$(d)$ Increasing the temperature of concentrated chamber acid. 195,600 (pounds of acid) x 52.5 (degrees increase in temperature) x .45 (mean specific heat) = 462,105 B. t. u.

*Summary.*

B. t. u.

54,405,000
16,593,750
47,545,600
462,105
———
119,006,455

An object of the invention is to provide a method whereby the available heat of the burner gases may be used to better advantage with the production of an acid product of higher concentration, say 66° Bé. This is accomplished without changing the design or the normal operation of the principal parts of the standard chamber plant, by merely providing for a different distribution of the acids. In accordance with the invention, instead of delivering the entire nitrous vitriol product of the Gay Lussac tower directly to the Glover tower for denitration, a portion of it is recirculated through the Gay Lussac tower, thus supplying the Gay Lussac tower with sufficient acid for the proper wetting of the packing, while reducing the fresh acid supply from the Glover tower to the Gay Lussac tower and reducing the flow of nitrous vitriol from the Gay Lussac tower to the Glover tower and thereby saving a portion of the heat represented by item (2), which heat thus becomes available for increasing the concentration of the acid in the Glover tower.

A further object of the invention is to improve the recovery of oxides of nitrogen which is accomplished by increasing the quantity of acid used to wet the fillings of the Gay Lussac tower. For example, whereas it is customary to circulate the minimum quantity of acid through the Gay Lussac tower, say a quantity equal to from two to two and one-half times the "make" of the plant, at the expense of an appreciable loss of oxids of nitrogen, I propose to use a quantity of absorbing acid equal to at least three times the "make."

The application of the invention in the operation of a typical chamber plant will be understood from the following description in conjunction with the accompanying drawing which represents diagrammatically the principal parts of a chamber plant, i. e. the Glover tower, the chambers and the Gay Lussac towers, and indicates the flows and distributions of acid. As is illustrated on the drawing, the hot burner gases pass through the Glover tower A, then through the chambers B, then through three Gay Lussac towers #1, #2 and #3 in series and finally to the exit. It is noted that three Gay Lussac towers are used in the illustration. This is not essential but merely represents the typical chamber plant. The invention is applicable as well to a single Gay Lussac tower or to any number of towers serially connected, as will be apparent. The movement of the acid, assuming the operation of a 100-ton plant, i. e. a plant producing the equivalent of about 100 tons of 61° Bé. acid per day, is as follows: The chambers produce about 125 tons of 50° Bé. acid per day. About 80.6 tons of this chamber acid are fed with about 100 tons of 61° Bé. nitrous vitriol from the Gay Lussac towers to the Glover tower, where the mixture is denitrated and concentrated, producing about 139.2 tons of 66° Bé. acid. A portion of the resulting 66° Bé. acid, about 83.6 tons, corresponding to the "make" of the plant, is withdrawn from the system as product and the remainder of the 66° Bé. acid, about 55.6 tons, is mixed with the remainder of the chamber acid, about 44.4 tons, giving 100 tons of 61° Bé. acid, which are delivered into the top of Gay Lussac tower #3 with 200 tons of the 300 tons of acid flowing from the bottom of the tower. Thus tower #3 is supplied with 300 tons of scrubbing acid which, as stated, is sufficient to properly wet the packing. Of the 300 tons of nitrous vitriol flowing from the bottom of tower #3, 200 tons are returned to the top of the tower, as stated, and the remaining 100 tons are delivered to the top of tower #2. Tower #2 also is supplied with 200 tons of recirculated acid, thus providing this tower with the requisite 300-ton supply, and 100 tons of the acid flowing from tower #2 go to tower #1 with 200 tons of recirculated acid. Of the 300 tons of acid (nitrous vitriol) flowing from tower #1, 100 tons are delivered with a portion of the chamber acid to the Glover tower. As is apparent, the operations described do not depend upon the use of three Gay Lussac towers. A single tower, for instance, tower #3 might be used and the outflow therefrom might be divided into two portions, one portion being recirculated and the other portion passing to the Glover tower directly instead of to tower #2.

By the foregoing procedure less than one-half of the customary quantity of nitrous vitriol is delivered from the Gay Lussac towers to the Glover tower for denitration and less than one-half of the customary quantity of absorbing acid is delivered from the Glover tower and chambers to the Gay Lussac towers which nevertheless are supplied with the customary quantity of scrubbing liquid. As a result it follows that the nitrous vitriol delivered from the Gay Lussac towers to the Glover tower is more than twice as concentrated with respect to oxids of nitrogen as normally, but since this nitrous vitriol is still far below saturation there is no interference with the absorption of oxids of nitrogen. The Gay Lussac towers operate in a normal manner, that is, they are of the usual gas handling capacity and the packing is properly wetted with somewhat more than the customary flow of liquid, giving an increase in the recovery of oxids of nitrogen. The principal difference in results between this process and the customary procedure occurs in the Glover tower. The Glover tower receives only 100 tons of nitrous vitriol and 80.6 tons of chamber acid, as compared with 200 tons of nitrous vitriol and 125 tons of chamber acid, according to the customary procedure, and as a result less heat is used to raise the temperature of the nitrous vitriol (item 2), and a correspondingly greater quantity of heat is used for concentration. By proper regulation of the circulating loads in the Gay Lussac towers it is possible, as is indicated by the following calculations of the heat utilization in the Glover tower, to produce acid of 66° Bé.

In the Glover tower 100 tons of nitrous vitriol at 61° Bé. must have its temperature raised from 100° F. to an assumed temperature mean between 400° F., the boiling point of 61° Bé. acid and 538° F., the boiling point of 66° Bé. acid, i. e. a rise in temperature of 369° at an assumed specific heat of .366, the mean between the specific heats 61° and 66° Bé. acid; 14.6 tons of water must be evaporated at an assumed latent heat of vaporization of 786 B. t. u.; the resulting 85.4 tons of 66° Bé. acid must have its temperature raised from the assumed mean temperature of 469° F. to 538° F.; the 80.6 tons of chamber acid must be heated from 200° F. to the mean between 295° and 538° at an assumed specific heat of .41; 26.8 tons of water must be evaporated from the chamber acid at the assumed temperature of 416.5° F. and latent heat of vaporization of 824 B. t. u.; and the temperature of the resulting 66° Bé. acid must be raised from 416.5° F. to 538° F.

(1) Increasing the temperature of the nitrous vitriol, 200,000 (pounds of acid) x 369 (degrees rise in temperature) x .366 (mean specific heat) = 27,010,800 B. t. u.

(2) Concentrating the nitrous vitriol, 29,200 (pounds of water evaporated) x 786 (the assumed latent heat of vaporization) = 22,951,200 B. t. u.

(3) Increasing the temperature of the concentrated nitrous vitriol, 170,800 (pounds of acid) x 69 (degrees rise in temperature) x .366 (specific heat) = 4,313,383 B. t. u.

(4) Increasing the temperature of chamber acid, 161,200 (pounds of acid) x 216.5 (degrees rise in temperature) x .41 (specific heat) = 14,308,914 B. t. u.

(5) Concentrating the chamber acid, 53,600 (pounds of water evaporated) x 824 (the assumed latent heat of vaporization) = 44,166,400 B. t. u.

(6) Increasing the temperature of the concentrated chamber acid, 117,600 (pounds of acid) x .41 (specific heat) x 121.5 (degrees rise in temperature) = 5,858,244 B. t. u.

Summary.

B. t. u.

27,010,800
22,951,200
4,313,383
14,308,914
44,166,400
5,858,244

118,608,941

By comparison it is seen that the heat used in the prior process producing 61° Bé. acid and the heat used in my process producing 66° Bé. acid are about equal.

It is to be clearly understood that the invention does not depend upon the correctness of the heat calculations which are given merely for the purpose of showing how, by the recirculation of absorbing acid in the Gay Lussac towers, heat otherwise required for heating up a relatively large quantity of dilute nitrous vitriol may be employed for concentrating the nitrous vitriol to a higher concentration.

It is further understood that the names Glover tower and Gay Lussac tower are used to designate any known apparatus serving the purpose of the apparatus known by these names and that the name chamber is used to designate any apparatus or device serving the purpose of the lead chambers in a so-called chamber plant, such as, for instance, reaction towers.

1. In the operation of a sulphuric acid plant comprising a denitrating tower and an oxids of nitrogen recovery tower the steps which consist in delivering denitrated acid from the denitrating tower to the inlet of the oxids of nitrogen recovery tower, returning a portion of the acid flowing from the oxids of nitrogen recovery tower to the inlet thereof, and delivering the remainder of the acid flowing from said oxids of nitrogen recovery tower to said denitrating tower.

2. In the operation of a sulphuric acid plant comprising a plurality of oxids of nitrogen recovery towers connected in series the steps which consist in introducing gases containing oxids of nitrogen into the first of said series of towers, introducing fresh absorbing acid into the last of said series of towers, returning a portion of the acid flowing from the bottom of each of said series of towers to the top thereof, and delivering a portion of the acid flowing from the bottom of each of said series of towers, excepting the first of the series into the next preceding tower of the series.

3. In the operation of a plant for the manufacture of sulphuric acid comprising a Glover tower, chambers and a Gay Lussac tower the steps which consist in denitrating and concentrating acid in the Glover tower to a concentration greater than that desired for use in the Gay Lussac tower, mixing a portion of the denitrated and concentrated acid produced in the Glover tower with a portion of the acid produced in the chambers in such proportion that a mixture of the desired concentration for use in the Gay Lussac tower is obtained, delivering the mixed acid into the Gay Lussac tower, returning a portion of the acid flowing from the Gay Lussac tower back into the Gay Lussac tower, and delivering the remainder of the acid flowing from the Gay Lussac tower and the remainder of the acid produced in the chambers to the Glover tower.

4. In the operation of a sulphuric acid plant comprising a Gay Lussac tower the steps which consist in supplying the Gay Lussac tower with a quantity of fresh absorbing acid which is less than the quantity required for the efficient operation thereof, and returning a portion of the acid flowing from the bottom of the tower to the top thereof in quantity sufficient with the fresh acid supply to permit the efficient operation of the tower.

5. In the operation of a plant for the manufacture of sulphuric acid comprising a Glover tower, chambers, and a Gay Lussac tower the steps which consist in supplying the Glover tower with nitrous vitriol from the Gay Lussac tower and acid produced in the chambers in such limited quantity that acid of a concentration greater than 60° Bé. is produced.

6. In the operation of a plant for the manufacture of sulphuric acid comprising a Glover tower, chambers, and a Gay Lussac tower, and in which the quantity of acid required for the efficient operation of the Gay Lussac tower amounts to at least twice the "make" of the plant, the steps which consist in supplying the Gay Lussac tower with a quantity of fresh absorbing acid about equal to the make of the plant and recirculating through the Gay Lussac tower a portion of the outflow of the Gay Lussac tower equal to about twice the "make" of the plant.

In testimony whereof, I affix my signature.

ELDON L. LARISON.